Patented Apr. 4, 1944

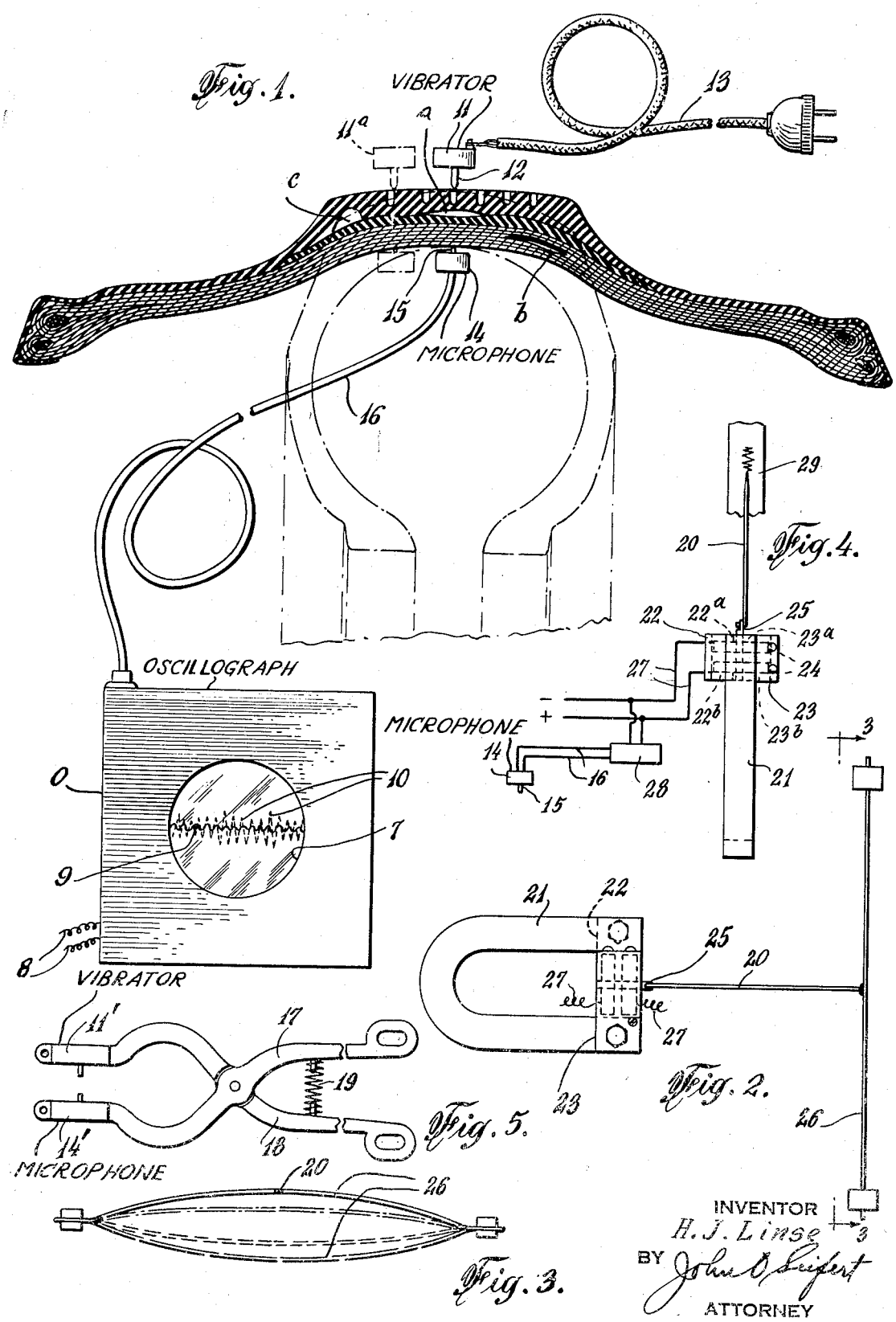

2,345,679

UNITED STATES PATENT OFFICE 2,345,679

METHOD OF TESTING PNEUMATIC TIRE CASINGS

Harry J. Linse, Stamford, Conn.

Application August 22, 1939, Serial No. 291,283

2 Claims. (Cl. 73—51)

This invention relates to the inspecting of the casings of pneumatic tires to detect inherent defects therein, such as voids or air pockets in the rubber tread, or separated portions between the fiber plies and between the fiber plies and tread material, which cannot be observed from a visual examination from the exterior of the tire casing, and it is the object of the invention to provide an improved method of testing tire casings for detecting defects therein.

While the invention is particularly adapted for inspecting the carcass of tire casings the treads of which are worn preparatory to retreading or recapping the same to detect defects in the carcass, such as separated portions of the fiber plies, it is also adapted for inspecting new tire casings for the purpose of detecting defects therein, such as voids or air pockets in the rubber tread, or separated portions between the fiber plies and between the fiber plies and rubber tread.

The percentage of tire casings failing to stand up after being retreaded or recapped is much higher than for new tire casings. The failure of retreaded tire casings to stand up in use is attributed to the abuse to which the tire casing was subjected during the period the initial tread was worn, and is caused by excessive flexing of the casing wall as a result of overloading and underinflation of the tire and thereby causing separation of the tread from the fiber plies and the fiber plies from each other. However, it has been demonstrated that separation of the tread from the fiber plies and the fiber plies from each other is often present in newly manufactured tire casings. In such cases in the use of the tire the separated surfaces are subjected to such frictional action as to cause said surfaces to wear down and pulverize the material adjacent thereto with the result that the expansion increases the flexure and generates heat of such high temperatures as to cause the tire casing to eventually become so weakened that it will not retain the pressure of the air in the inner tube confined within the tire casing and results in a blow-out or complete destruction of the tire casing. Should a new tire casing have this defect of a separation between a portion of the tread and fiber plies or between the fiber plies, as often occurs, this pulverization of the material at the point of separation has its inception at the commencement of use of the new tire with the result that a portion of the tread may be caused to separate from the fiber plies or portions of the fiber plies separated from each other within a period of time less than it would take to wear down half the tire tread, and during the interval of the time the tire casing was used to wear the tread to such an extent as to make it desirable to retread or recap the tire casing the carcass of the tire casing is so weakened that it would not warrant retreading or recapping the same. It is impossible to detect any separation between the fiber plies or between the fiber plies and worn portion of the tread of the tire casing by a careful and thorough inspection of the same by the methods and means now used with the result that tire casings are retreaded or recapped that are absolutely useless to perform the function intended by the tire and are dangerous in use, since the casing is not sufficiently strong to retain the pressure of the air in the inner tube within the casing and it is liable to blow out at any time.

In the manufacture of tire casings during the building up of the component parts thereof, small quantities of air are trapped between the rubber and fiber plies and air is sometimes contained in the cord or fiber plies, which air during the process of curing the tire casing localizes itself in the form of an air space or pocket usually at the shoulder buttons or breaker of the tire casing. In use, as the tire casing is flexed the portions at and adjacent such air pockets are contracted and expanded to a greater extent than the remaining portion of the tire casing which tends to rupture and tear the rubber at such portions thereof. It is also impossible to detect such air pockets in the tire casing by the present method of and means for inspecting tire casings for defects therein.

It is another object of the invention to provide an improved method of inspecting tire casings to detect and indicate or record any defects in the interior of the structure of the tire casing, such as separations between the fiber or cord plies and said plies and the tread of the casing, as well as the location of any air spaces or pockets therein.

In carrying out the invention there is provided means, such as a vibrator, preferably electrically operated and vibrated at a predetermined pitch, to tap a surface of the tire casing to produce a vibration in the material of the tire casing, and means, such as a pick-up microphone, is adapted to detect and pick up at the opopsite surface of the tire casing vibrations transmitted through the material thereof, and the microphone connected to and causing the detected vibrations to energize and actuate an electric indicating instrument in proportion to the intensity of the vibrations transmitted through sound and defective portions of the tire casing.

The indicating means may comprise an oscillograph apparatus including a cathode ray tube and beam deflecting means for the cathode ray of said tube the electric circuits of which are tuned to normally oscillate at a predetermined frequency and project a cathode ray beam of predetermined pattern or wave formation upon the screen of the cathode ray tube, a microphone to pick up the vibrations transmitted through the tire casing being connected in the circuit of the controlling system for the vertical beam deflecting elements of the cathode ray tube of the oscillograph apparatus to vary the normal frequency of said circuit and thereby the pattern or vertical wave trace of the projected cathode ray beam proportional to the magnitude of the vibrations transmitted through the material of the tire casing and picked up by the microphone. Or said indicating means may comprise a vibratory member and electrically operated means to normally impart vibrations to the vibratory member of predetermined pitch and extent, with said pick-up microphone connected with amplifying means in the circuit of said electrically operated means to vary the vibrations of the vibratory member in accordance with variations produced in the vibrations transmitted through the material of the tire casing, or the pick-up device may function to cause the operation of the electrically operated means for the vibrator to vibrate the vibratory member in correspondence with variations in the vibrations transmitted through the tire casing, or the vibrator may be in the form of a carrier for a scriber to inscribe the movement of the scriber upon a record chart, such as a dial or tape travelling relative to the scriber, and make a permanent record of the movements of the scriber and thereby of the vibrations produced in material of the tire casing and thereby the condition of the tire casing.

In the drawing accompanying and forming a part of this application,

Figure 1 is an elevational view of the component elements of means for carrying out the method of treating composite material or pneumatic tire casings and to indicate defects in the structure thereof in relation to a spread portion of a tire casing, shown in full lines in cross section relative to its normal condition shown in dot and dash lines.

Figure 2 is a plan view of a modified embodiment of oscillating or vibratable means for indicating defects in the structure of a pneumatic tire casing.

Figure 3 is a sectional view taken on the line 3—3 of Figure 2.

Figure 4 is an elevational view of the oscillating or vibratable means shown in Figure 2 and showing the electrical connection of said means with the vibration pick-up device and amplifying means interposed in the operating electric circuit of the oscillating or vibratable means; and Figure 5 is a side elevation of means for supporting and manipulating the vibrator and pick-up device.

The embodiment of the means for carrying out the invention as shown in Figure 1 of the drawing comprises an oscillograph apparatus, shown in a general way at 0, and may comprise a conventional type of oscillator including a cathode ray tube mounted in a casing having a coating of fluorescent material on the inner surface of the end thereof and constituting the screen upon which the pattern or wave trace of the cathode ray beam is projected and visible or observable through an opening in the casing, as at 7. The oscillograph apparatus is connected, as by conductors 8, in circuit with a commercial source of alternating electric current having the usual voltage of 120 volts, and the oscillator circuits for the beam deflecting elements of the cathode ray tube are tuned to project a cathode ray or beam of predetermined pattern upon the screen of the cathode ray tube, as shown by the full lines 9.

To test a pneumatic tire casing for defects in the structure thereof, vibrations are produced in the material of the tire casing and the circuit of the vertical beam deflecting elements of the cathode ray tube of the oscillograph apparatus is varied by and in proportion to the intensity or magnitude of the vibrations transmitted through the material of the tire casing and accordingly vary the pattern of the cathode ray beam projected on the screen of the cathode ray tube, for instance, as shown by dotted lines 10.

As stated, the invention is particularly adapted for detecting air spaces or pockets in the tread material of a tire casing, or to detect separated portions between the fiber plies and between said fiber plies and the tread of the tire casing. In testing a tire casing for defects, successive portions of the tire casing are tested in successive sequence, and preparatory to testing the same an outward spreading force is exerted on the opposite side wall portions of the tire casing spreading them from the normal position shown in dot and dash lines to the position shown in cross section in full lines. Should there be any separated portions between the tread and fiber plies or between the fiber plies, such portions in the normal condition of the tire, as shown in dot and dash lines, will lie substantially in contiguous relation to each other. However, when the side wall portions of the tire casing are spread, as shown, the resistance of the tire material to such spreading movement will cause said separated portions to spread apart, as shown for illustrative purposes at $a$ where a portion of the tread is separated from the adjacent fiber ply, and as at $b$ where a portion of a fiber ply is separated from an adjacent fiber ply.

To set up vibrations in and transmit the same through the material of the tire casing, there is provided an electrically operated vibrator 11 including an electromagnetically actuated diaphragm having a pin or probe 12 connected centrally thereto. The vibrator is adapted for connection of electric conductors 13 having an electrical connection device connected thereto whereby to connect the vibrator to an operating source of electric energy. The vibrator 11 is positioned with the pin or probe 12 adjacent to or in contact with a surface of the tire casing, shown as disposed at the outer surface thereof, and thereby striking or tapping the surface of the tire casing and setting up and transmitting vibrations through the material thereof. Should the vibrator be disposed, as shown in dot and dash lines 11a, relative to a sound portion of the tire casing, that is, a portion of the casing where there is no separation between the fiber plies and tread or between the fiber plies, the vibrator produces vibrations in and transmits vibrations through the material of the tire casing to the inner surface thereof of the same magnitude as the vibrations of the vibrator. However, should the vibrator be disposed relative to a spread separated portion between the tread and carcass of the tire casing, as shown in full lines, or disposed relative to a spread separated portion between the fiber plies, as at b, the magnitude of the vibrations of the vibrator produced and transmitted through the material of the tire casing will be materially reduced and may be practically nil depending on the extent of the separated portions and the extent to which said separated portions are spread apart. Should the reduction in the magnitude of the vibrations occur at a point between the shoulders of the tread, it will indicate that the defect consists of a separation between the fiber plies and tread or between the fiber plies, and should the reduction in magnitude of the vibrations occur at the shoulders of the tread it will indicate that the defect consists of an air space or pocket in the tread material, as indicated in a conventional manner at c.

To visibly indicate defects in the tire casing, means are provided to pick up the vibrations produced in and transmitted through the material of the tire casing said means being connected in circuit with and varying the frequency of the circuit of the vertical beam deflecting elements of the cathode ray tube of the oscillograph apparatus and thereby varying the pattern of the cathode ray beam projected onto the screen of the cathode ray tube proportional to the magnitude of the vibrations picked up and the magnitude of the electric current generated by the microphone. This, as shown, comprises a pickup microphone 14 disposed at the inner surface of the tire casing. A pin or plug connected centrally to the diaphragm thereof may be contacted with the surface of the tire casing in opposed relation to the vibrator 11. The microphone is connected by conductors carried by a cable 16 preferably having amplifying means interposed therein is connected in the circuit of and the voltage thereof applied to the vertical beam deflecting element of the cathode ray tube of the oscillograph apparatus.

While the vibrator and microphone are shown as disposed at the outer and inner surfaces of the tire casing respectively, it will be obvious that the vibrator may be disposed at the inner surface and the microphone at the outer surface of the tire casing.

In operation, the elements of the oscillograph apparatus and vibrator 11 are connected in circuit with a source of electric energy. The circuits of the cathode ray deflecting elements of the oscillograph apparatus being adapted to project a cathode ray beam onto the screen of the cathode ray tube having a predetermined pattern or wave trace, substantially as indicated by the full line 9. The microphone 14 is then disposed at the inner surface of the tire casing and the pin or probe of the vibrator 11 is caused to strike or tap the surface of the tire casing in opposed relation to the microphone and in said positions the vibrator and microphone are moved relative to the tire casing. As they are moved to the position shown in full lines with a spread separated portion between the tread and carcass of the tire casing, the magnitude of the vibrations produced in and transmitted through the material of the tire casing is materially reduced, with the result that the vibrations picked up by the microphone 14 are inappreciable and will not effect any variation in the electric circuit of the vertical beam deflecting elements of the cathode ray tube of the oscillograph apparatus or in the pattern of the cathode ray beam projected onto the screen of the cathode ray tube, the pattern remaining substantially as indicated by the full line 9 and indicating that there is a defect in said portion of the tire casing. As the microphone and vibrator are moved relative to a sound portion of the casing, as represented by the dot and dash line position thereof, the vibrations transmitted through the tire casing by the vibrator and picked up by the microphone will be substantially the same and will effect a variation in the circuit of the vertical beam deflecting elements of the cathode ray tube of the oscillograph apparatus and increase the vertical trace of the cathode ray projected onto the screen of the cathode ray tube and produce a cathode beam or ray pattern or wave trace substantially as shown in dotted lines 10 and indicating that such portion of the tire casing is sound.

To support and facilitate the manipulation of the vibrator and microphone, there is provided a plier device, as shown in Figure 5, consisting of a pair of pivotally connected levers 17, 18 arranged as hand grips at one end and arranged at the opposite ends with portions of split circular form for the engagement and releasable securing therein of the microphone and vibrator disposed in substantially parallel relation and the pins in opposed relation, said ends of the levers being of outwardly curved form whereby the tire casing may be readily engaged between said ends of the levers. The levers may be urged to predetermined spread position by a spring 19 shown disposed between the hand engaging ends of the levers.

In Figures 2, 3 and 4 there is shown modified electrically operated oscillating or vibratable means adapted to be controlled by vibrations transmitted through the material of a tire casing and visibly indicate defects therein and comprising a polarized electric motor adapted to vibrate a vibratory member 20. The motor includes a U-shaped member 21 of magnetizable material or a permanent magnet having pole pieces 22, 23 fixed thereto, the one pole piece 22 being fixed to the extremity of one leg at one side of the U-shaped member and the other pole piece 23 fixed to the extremity of the other leg at the opposite side of said member and extending inwardly to substantially midway between the legs of said U-shaped member. Each pole piece has laterally extending spaced portions 22a, 22b and 23a and 23b, said portions extending toward each other and terminating in spaced relation between the legs of the U-shaped member and support a pair of coils 24 therebetween with an armature 25 mounted to extend through the coils 24 and the spaces between the pole piece extensions 22a, 23a, and 22b, 23b to have vibratory movement between said pole piece extensions upon the energizing of the coils by alternating electric current. The vibratable member 20 is connected at one end to the armature 25 to participate in the vibrations thereof, and to render the vibrations of the vibratable member readily visible it may be connected at the opposite end midway the ends of a rod of resilient material 26 anchored at the opposite ends, the vibratory movements of the vibratable member 20 bowing said resilient rod, as shown in an exaggerated manner in Figure 3.

In operation the coils 24 are connected by conductors 27 in circuit with a source of electric current and the vibratable member is vibrated at a predetermined frequency. The microphone 14 is connected to the conductors 27 with an amplifier 28 interposed in said connection and the microphone is contacted with the surface of the tire casing opposite to the vibrator. Should said vibrator and microphone be disposed relative to a portion of the tire casing wherein the tread is separated from the adjacent fiber ply, or relative to a portion of the tire casing wherein the fiber plies are separated from each other, as at $a$ or $b$, the magnitude of the vibrations produced and transmitted through the material of the tire casing and picked up by the microphone are approximately nil there will be no variation in the magnitude of the vibratory movements of the vibratable member 20 or the member 26. Should the microphone and vibrator be disposed relative to a sound portion of the tire casing the intensity of the vibrations picked up by the microphone are substantially the same as the vibrations transmitted through the material of the tire casing by the vibrator 11, with the result that there will be a corresponding variation in the operating electric circuit of the coils 24 and a variation in the frequency and magnitude in the vibration of the vibratable member 20.

The form of the invention shown in Figures 2, 3 and 4 is adapted for use in making a record of the vibratable movements of the vibratable member and thereby make a record of the condition of a tire casing or other composite material. For this purpose the vibratable member 20 may be in the form of a stylus or scriber to inscribe the vibratory movements thereof upon a record chart, which may comprise a paper tape, as shown at 29 in Figure 4, caused to travel relative to the scriber in a direction transverse to the vibratory movement thereof, or such record chart may consist of a rotatable disk.

Various modifications may be made in the construction and arrangement of the parts without departing from the scope of the invention.

Having described my invention, I claim:

1. The method of testing pneumatic tire casings to detect separated portions between the component parts thereof, which consists in spreading the side walls of the tire casing to augment the separation of the deflective portions, and then while holding the tire casing in said condition inducing a vibration in the material of the tire casing at one surface thereof, detecting vibrations transmitted through the material of the tire casing to the opposite surface thereof, and causing said detected vibrations to energize an indicating instrument in proportion to the intensity thereof.

2. The method of testing a pneumatic tire casing which comprises successively spreading the casing at spaced points about its periphery, creating a uniform tapping sound on a wall of the casing at the point of spreading, and detecting vibrations transmitted through the wall to the opposite side thereof as an index of the condition of the tire.

HARRY J. LINSE.